US012592214B2

(12) United States Patent
McGee

(10) Patent No.: US 12,592,214 B2
(45) Date of Patent: Mar. 31, 2026

(54) FOOT CONTROLLED SWITCH STABILIZING APPARATUS

(71) Applicant: James Charles McGee, Crystal Lake, IL (US)

(72) Inventor: James Charles McGee, Crystal Lake, IL (US)

( * ) Notice: Subject to any disclaimer, the term of this patent is extended or adjusted under 35 U.S.C. 154(b) by 0 days.

(21) Appl. No.: 18/634,499

(22) Filed: Apr. 12, 2024

(65) Prior Publication Data

US 2024/0347027 A1      Oct. 17, 2024

Related U.S. Application Data

(60) Provisional application No. 63/496,092, filed on Apr. 14, 2023.

(51) Int. Cl.
G10G 5/00 (2006.01)
F16M 11/24 (2006.01)

(52) U.S. Cl.
CPC ........... G10G 5/005 (2013.01); F16M 11/245 (2013.01)

(58) Field of Classification Search
CPC .............................. F16M 11/245; G01G 5/005
See application file for complete search history.

(56) References Cited

U.S. PATENT DOCUMENTS

| | | | | | |
|---|---|---|---|---|---|
| 1,843,553 | A | * | 2/1932 | Gladstone | G10D 13/08 984/155 |
| 2,194,545 | A | * | 3/1940 | Firestone | G10D 13/08 984/155 |
| 3,667,316 | A | * | 6/1972 | Valletti | G05G 1/60 74/560 |
| 4,226,154 | A | * | 10/1980 | Easler | G10H 1/00 84/DIG. 12 |
| 4,445,415 | A | * | 5/1984 | Izquierdo | G10G 7/005 984/259 |
| 4,561,339 | A | * | 12/1985 | Jensen | A47B 19/002 84/327 |
| 4,763,865 | A | * | 8/1988 | Danner | G10G 5/00 108/118 |
| 5,475,214 | A | * | 12/1995 | DeFranco | G06F 3/011 250/221 |
| 5,986,197 | A | * | 11/1999 | Allen | G10D 13/02 84/421 |
| 6,459,023 | B1 | | 10/2002 | Chandler | |

(Continued)

OTHER PUBLICATIONS

Laing, Rob, "D'Addario has released an expandable pedalboard called the XPND", MusicRadar, Feb. 3, 2021 (22 pages), also available at https://www.musicradar.com/news/daddario-has-released-an-expandable-pedalboard-called-the-xpnd.

*Primary Examiner* — Monica E Millner
(74) *Attorney, Agent, or Firm* — Crowell & Moring LLP

(57) ABSTRACT

A stabilizing apparatus for a foot-controlled switch configured to control a musical instrument includes: an elongate shaft having an adjustable length, the elongate shaft extending from a first end to a second end. The first end is configured to engage with a first portion of a base of a musical equipment stand, and the second end is configured to engage with a second portion of the base of the musical equipment stand. The stabilizing apparatus also includes a retainer defining a retaining area for the foot-controlled switch, the retainer coupled to and extending from the elongate shaft.

19 Claims, 10 Drawing Sheets

(56)        References Cited

U.S. PATENT DOCUMENTS

| | | | | |
|---|---|---|---|---|
| 6,528,714 | B1 * | 3/2003 | Liao | G10D 13/065 |
| | | | | 84/422.1 |
| 6,563,035 | B2 * | 5/2003 | Hsieh | G10G 5/00 |
| | | | | 84/421 |
| 6,685,145 | B2 * | 2/2004 | Mackay | A47F 5/02 |
| | | | | 248/125.1 |
| 6,720,490 | B1 * | 4/2004 | Bruce | A47B 19/002 |
| | | | | 84/421 |
| 7,368,647 | B2 * | 5/2008 | Hsieh | F16M 11/38 |
| | | | | 248/431 |
| 7,473,842 | B2 * | 1/2009 | Naito | G10H 1/32 |
| | | | | 84/718 |
| 7,497,812 | B2 * | 3/2009 | Neff | A63B 22/0694 |
| | | | | 482/8 |
| 7,511,212 | B1 | 3/2009 | Chang | |
| 7,514,619 | B1 * | 4/2009 | Bruce | A47B 81/00 |
| | | | | 248/463 |
| 7,655,854 | B1 | 2/2010 | Wang | |
| 8,525,009 | B2 * | 9/2013 | Stevens | G10D 13/08 |
| | | | | 84/402 |
| 8,678,403 | B1 * | 3/2014 | McCleave | B62B 3/02 |
| | | | | 248/129 |
| 8,723,010 | B1 * | 5/2014 | Knights | G10G 5/00 |
| | | | | 84/424 |
| 9,245,503 | B2 * | 1/2016 | Allen | G10D 13/02 |
| 9,620,094 | B2 * | 4/2017 | Abbate | F16M 13/02 |
| 9,644,785 | B2 * | 5/2017 | Carpenter | F16M 11/24 |
| 9,812,097 | B1 * | 11/2017 | Rich | G10G 5/005 |
| 10,755,680 | B2 | 8/2020 | Palmer | |
| 2006/0120550 | A1 * | 6/2006 | McCann | H04R 1/08 |
| | | | | 381/366 |
| 2010/0285924 | A1 * | 11/2010 | Shauli | A63B 23/03541 |
| | | | | 482/8 |
| 2023/0335087 | A1 * | 10/2023 | Nagatsuma | G10G 5/005 |
| 2025/0054467 | A1 * | 2/2025 | Tweedie | G10C 3/26 |

* cited by examiner

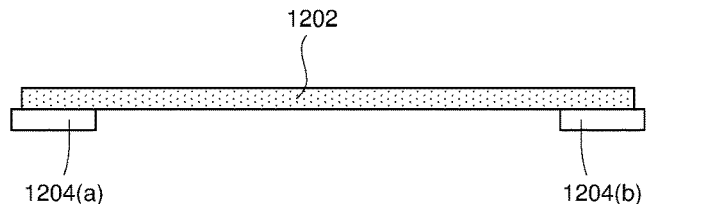
FIG. 12A
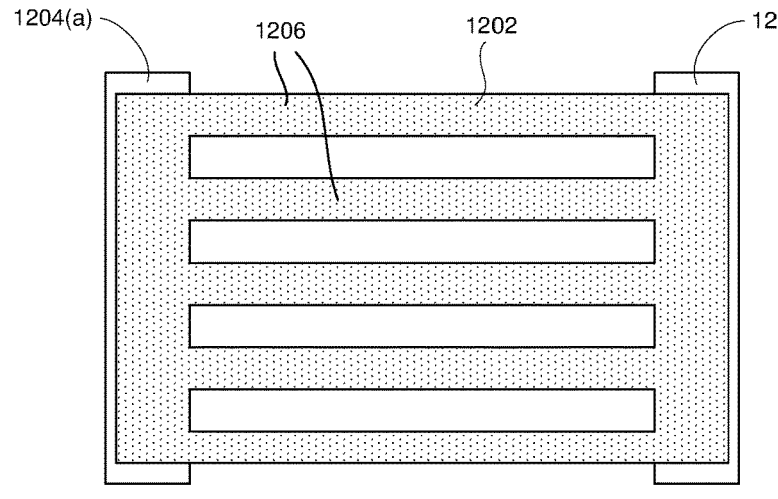
FIG. 12B
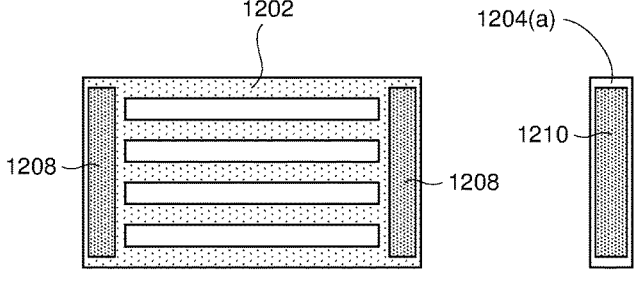
FIG. 12C
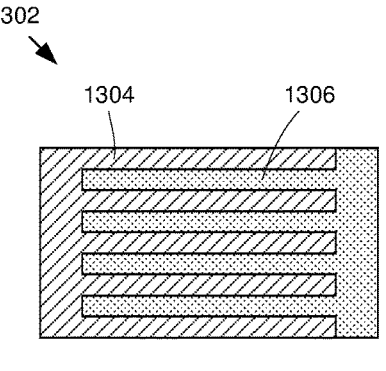
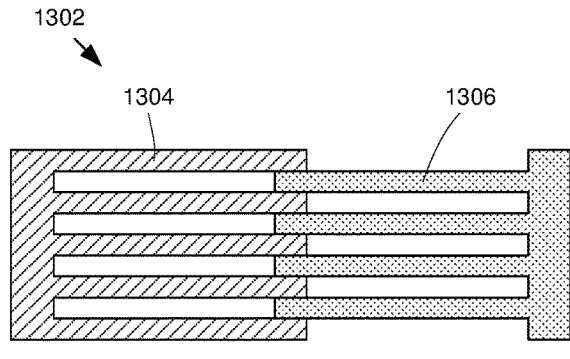
FIG. 13A               FIG. 13B

1400

1404

1402

1404

1500

1502

1506

1504

1504

FOOT CONTROLLED SWITCH STABILIZING APPARATUS

CROSS-REFERENCE TO RELATED APPLICATIONS

The present application claims the benefit of priority to U.S. Provisional Application No. 63/496,092, filed Apr. 14, 2023. The contents of U.S. Provisional Application No. 63/496,092 are incorporated herein by reference in their entirety.

TECHNICAL FIELD

The present invention relates generally to musical equipment, and more particularly to stabilizing apparatuses for foot-controlled switches.

BACKGROUND

Foot-controlled switches or pedals allow a musician to control a musical instrument with his/her foot. Such devices provide a musician with enhanced playability of a musical instrument, especially in situations where the musician is already using both of his/her hands to play the instrument.

For certain types of musical instruments, such as acoustic pianos, harps, or organs, the foot-controlled switch is permanently built in or attached to the instrument. However, with the advent of more portable instrument options and electronic instruments, other types of foot-controlled switches are separately configured from a musical instrument, and form a wired connection with the musical instrument using a cable, or in some cases can wirelessly connect to the musical instrument.

In general, when a musician is to play or otherwise set up a musical instrument with a foot-controlled switch that is separately configured from the musical instrument, the musician, or another person, may position the foot-controlled switch on the floor in a desired location relative to the musical instrument. However, the friction between the floor and the foot-controlled switch may be less than sufficient such that the musician's use of the foot-controlled switch (e.g., the musician's foot depressing the pedal) causes the foot-controlled switch to move or slide way from the desired location. During such situations, the musician may be undesirably forced to use a hand or foot to reposition the foot-controlled switch back to the desired location, including during times when the musician is still trying to play the musical instrument.

In the past, musicians have tried various tactics to prevent a foot-controlled switch from moving. In one way, the musician places a heavy object, such as a brick, behind the foot-controlled switch. In another way, the musician uses tape or other adhesive, or a mechanical means such as a screw, to adhere or affix the foot-controlled switch to the floor or to the musician's footwear. However, such ways are less than optimal, in that they are effective only for a limited duration, can damage the floor and/or footwear, and/or require too much time to setup and/or take down. Thus, ways to provide a stabilizing system for a foot-controlled switch that overcomes these deficiencies may be desirable.

BRIEF SUMMARY

The present describes various embodiments of a stabilizing apparatus for a foot-controlled switch operatively coupled to a musical instrument, and related musical systems and methods of use and/or assembly. In some implementations, a stabilizing apparatus for a foot-controlled switch configured to control a musical instrument includes: an elongate shaft having an adjustable length, the elongate shaft extending from a first end to a second end, wherein the first end is configured to engage with a first portion of a base of a musical equipment stand, and the second end is configured to engage with a second portion of the base of the musical equipment stand; and a retainer defining a retaining area for the foot-controlled switch, the retainer coupled to and extending from the elongate shaft.

In some other implementations, a musical system includes the above stabilizing apparatus and at least one of: a musical equipment stand, a musical instrument, or at least one foot-controlled switch configured to operatively couple to and/or control the musical instrument.

In some other implementations, a method of assembling musical equipment includes: adjusting a length of an elongate shaft to correspond to a dimension of a base of a musical equipment stand; and coupling a first end of the elongate shaft to a first portion of the base and a second end of the elongate shaft to a second portion of the base, wherein a retainer for a foot-controlled switch is coupled the elongate shaft upon coupling the first end to the first portion of the base and the second end to the second portion of the base, the retainer defining a retaining area for positioning of the foot-controlled switch; and positioning the foot-controlled switch in the retaining area defined by the foot-controlled switch.

Other implementations are possible, and each of the implementations can be used alone or together in combination. Accordingly, various embodiments are described below with reference to the accompanying drawings.

BRIEF DESCRIPTION OF THE DRAWINGS

FIG. 12A shows a side view of an example implementation of a bridge extending over legs of a retainer that may be implemented with a foot-controlled switch stabilizing apparatus.

FIG. 12B shows a top view of the bridge and legs of FIGS. 12A.

FIG. 12C shows respective back side and top views of the bridge and legs of FIGS. 12A and 12B, implemented with hook-and-look fastener material to configure the bridge as a removable attachment piece.

FIG. 13A shows a top view of another example implementation of a bridge having an adjustable width, with the bridge in a collapsed position.

FIG. 13B shows a top view of the bridge of FIG. 13A, with the bridge in an expanded configuration.

DETAILED DESCRIPTION

The present description describes various implementations of a stabilizing apparatus for at least one foot-controlled switch that connects to a musical instrument via a wired or wireless connection. As described in further detail below, one interesting feature is that the stabilizing apparatus provides a structure the provides a stable retaining area for a foot-controlled switch so that the foot-controlled switch does not move from a desired location while a musician is using the foot-controlled switch. Another interesting feature is that the stabilizing apparatus is removably attachable to a musical equipment stand supporting a musical instrument with which the foot-controlled switch operates. Additional interesting features are that the stabilizing apparatus is relatively easy to use, requires minimal set-up time, is relatively compact, and is readily transportable. Further interesting features include that the stabilizing apparatus is compatible with a wide variety of different types of musical instrument stands having sundry arrangements of legs or supports and bases, and that it can accommodate a wide variety of different types and sizes of foot-controlled switches.

Figure 1A:
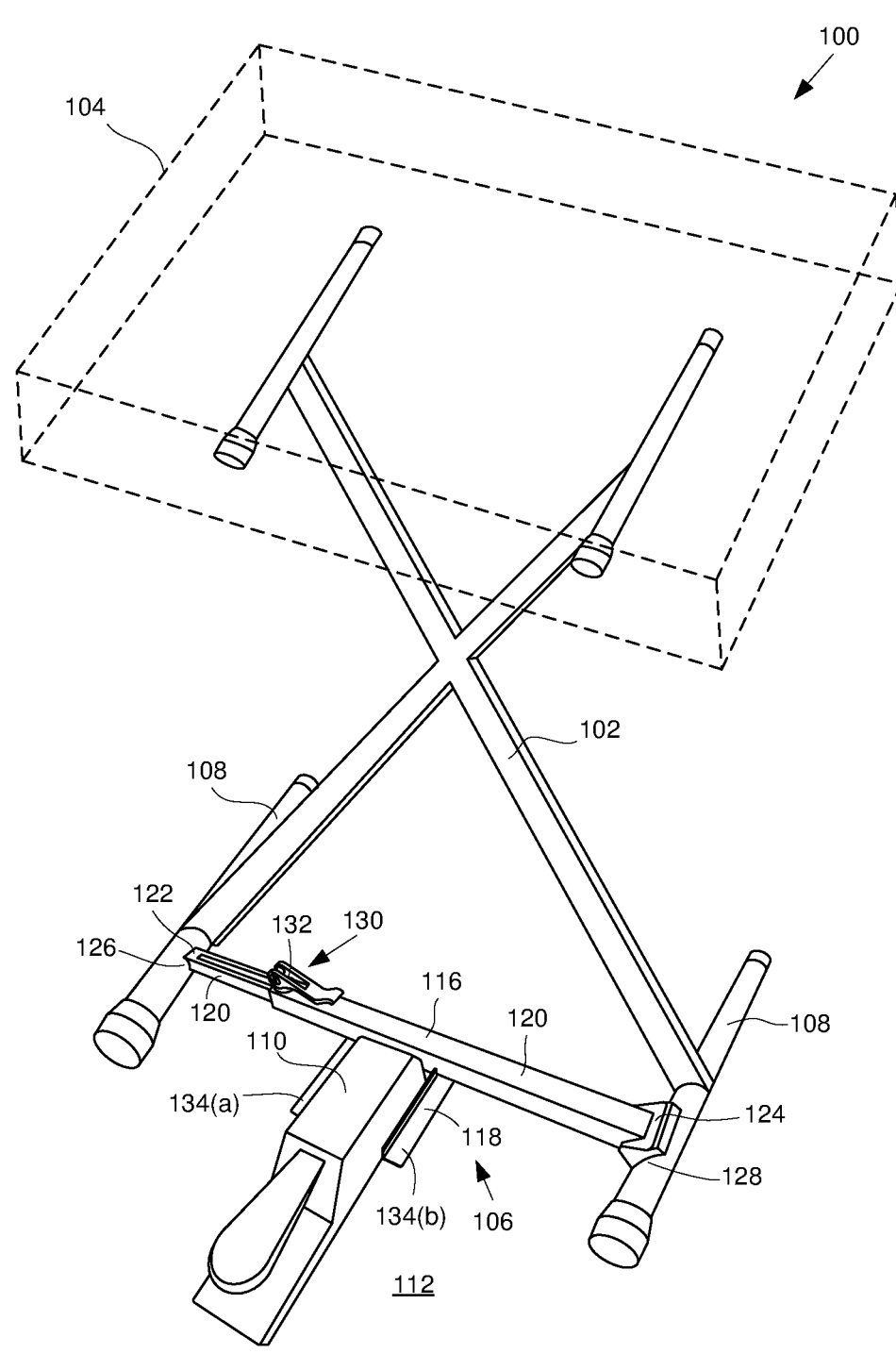
FIG. 1A shows a perspective view of a musical system including stabilizing apparatus for a foot-controlled switch.
Figure 1B:
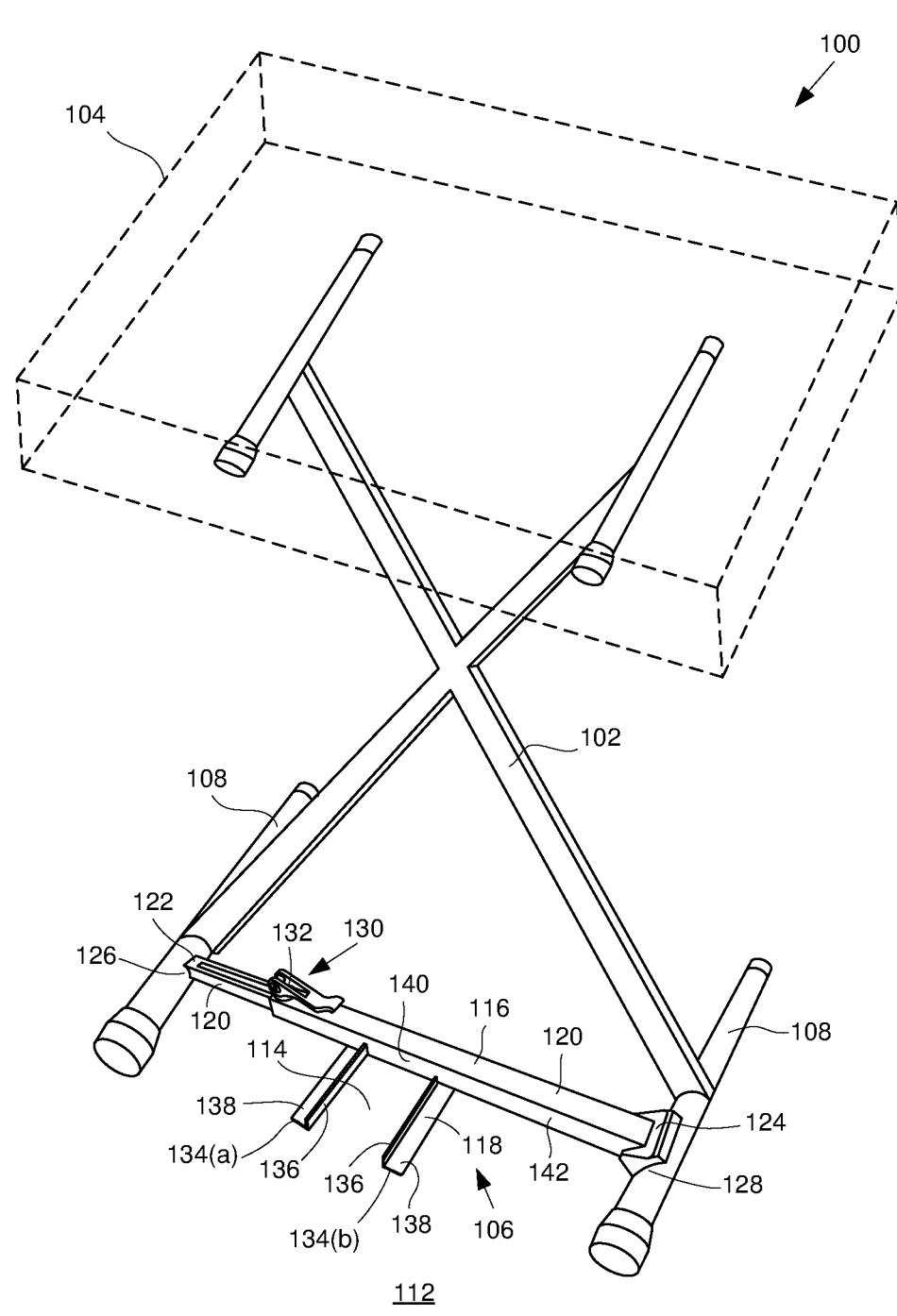
FIG. 1B shows a perspective view of the musical system of FIG. 1A, but without the foot-controlled switch.

FIGS. 1A and 1B show an example implementations of a musical system 100 that includes a musical equipment stand 102 that supports a musical instrument 104. The musical system 100 also includes a foot-controlled switch stabilizing apparatus (for simplicity also called herein a stabilizing apparatus) 106 that is removably attachable with the musical equipment stand 102, and in particular a base 108 of the musical equipment stand 102. The musical system 100 also includes at least one foot-controlled switch 110. As described in further detail below, the stabilizing apparatus 106 is configured to stably hold or retain the at least one foot-controlled switch 110 in a desired location or position relative to the musical equipment stand 102 and/or the musical instrument 104, relative to a floor 112 on which musical equipment stand 102 and/or the stabilizing apparatus 106 may be positioned or disposed, and/or relative to a stool or chair (not shown) on which a musician is sitting, including during periods while the musician is operating the foot-controlled switch 110. FIG. 1A shows the musical system 100 with the at least one foot-controlled switch 110. FIG. 1B shows the musical system 100 without the at least one foot-controlled switch 110.

Additionally, the example implementations of the musical system 100 shown in FIG. 1A includes only one foot-controlled switch 110 stably retained by the stabilizing apparatus 106. In other implementations, the stabilizing apparatus 106 stably retains a plurality of foot-controlled switches 110, as described in further detail below.

Various other implementations or embodiments of the musical system 100 may include more or fewer components than the ones shown herein. For example, other implementations or embodiments may include only the stabilizing apparatus 106; or only the stabilizing apparatus 106 and the musical equipment stand 102; or only the stabilizing apparatus 106 and the foot-controlled switch 110; or only the stabilizing apparatus 106, the musical equipment stand 102, and the foot-controlled switch 110. Various other implementations or embodiments including the stabilizing apparatus 106 alone or in combination with at least one but not all of the other components of the musical system 100 and/or in combination with other or additional components used in a musical system, are possible.

In further, detail, the musical equipment stand (also called herein a musical instrument stand, or just stand) 102 is any piece of structure, furniture, or equipment designed to support or hold a musical instrument and/or on which a musical instrument may be placed, particularly during time periods that the musical instrument is being played by a musician. FIGS. 1A, 1B shows the musical equipment stand 102 configured as an X type stand, although any of various other configurations may be possible, non-limiting examples of which include Z type stands, a four-leg table type stand, or electronic and/or acoustic drum stands. Correspondingly, the musical instrument 104 is any type of acoustic or electronic instrument that can be mounted or positioned on the musical equipment stand 102 and that can be controlled by, played with, and/or that can connect to a foot-controlled switch. Non-limiting examples of such a musical instrument 104 may include an electronic keyboard, piano, synthesizer, Musical Instrument Digital Interface (MIDI) controller, or other similar type of electronic musical device that can be played with piano keys, although any of various other types of musical instruments, with or without piano keys, may be possible.

In addition, the foot-controlled switch 110 is any type of device, including electronic device, designed to be positioned on or near a floor or otherwise for use by a foot of a musician to control a musical instrument. As used herein, a foot-controlled switch may be, include, have the functionality of, or also or interchangeably be referred to as foot pedal, a pedal, a pedal switch, a keyboard sustain pedal, an express pedal, a foot-controlled MIDI trigger device, or the like. Correspondingly, a foot-controlled switch may control a musical instrument in any of various ways, such as by controlling a sustaining of a note that the musical instrument is playing or by otherwise controlling any of various settings the musical instrument may have to effect a given sound output. As previously described, the foot-controlled switch 110 may connect to the musical instrument 104 via a wired or wireless connection in order to control the musical instrument 104. In this context, the foot-controlled switch 110 shown in FIG. 1A is merely an example, and any of various other types of foot-controlled switches may be used with the stabilizing apparatus 106.

Referring particular to FIG. 1B, the stabilizing apparatus 106 is a device, apparatus, structure, or assembly that defines a retaining or retention area or location 114 in which the at least one foot-controlled switch 110 is, or is to be, placed, positioned, or disposed for operation by a musician's foot, including during times when the musician is playing the musical instrument 104. Although not necessarily, the area or location is generally considered to be a desired or optimal location that the musician wants the foot-controlled switch 110 to be when playing the musical instrument 104. By stably retaining the foot-controlled switch 110, the stabilizing apparatus 106 prevents the foot-controlled switch 110 from moving or sliding relative to the musical equipment stand 102, the musical instrument 104, the floor 112, and/or a chair or stool (not shown) on which the musician is sitting when playing the musical instrument.

In further detail, in at least some implementations, the stabilizing apparatus 106 is removably attachable to the base 108 of the musical equipment stand 102. By being removably attachable, the stabilizing apparatus 106 is configured to be attached and/or engaged to the base 108 and detached and/or disengaged from the base 108 as part of its intended use, assembly, and/or functionality in conjunction with the musical equipment stand 102, such as without destroying or degrading the structural integrity of the musical equipment stand 102 and/or the stabilizing apparatus 106. Accordingly, in at least some implementations during assembly, the musical equipment stand 102 may be set up and/or positioned on the floor 112, and then the stabilizing apparatus 106 may be attached to the base 108 of the stand 102. Then, during disassembly, the stabilizing apparatus 106 may be detached from the base 108 before subsequent action related to disassembly is taken on the stand 102, such as removal from the floor 112 or folding or collapsing the stand 102.

Additionally, when the stabilizing apparatus 106 is attached to the musical equipment stand 102, the stabilizing apparatus 106 and the musical equipment stand 102 have a fixed attachment with each other. Through the fixed attachment, the musical equipment stand 102 provides resistance to the stabilizing apparatus 106 that allows the stabilizing apparatus 106 to withstand forces it receives from the foot-controlled switch 110 when the foot-controlled switch 110 is being operated on, such as while the musician is playing the musical instrument 104. That is, during normal use of the foot-controlled switch 110, the forces exerted on the foot-controlled switch 110 by the foot of the musician are typically not strong enough to move the musical equipment stand 102, which prevents the stabilizing apparatus 106, and in turn, the foot-controlled switch 110, from moving despite the forces exerted on the foot-controlled switch 110, thereby allowing the stabilizing apparatus 106 to provide a stable retaining area 114 for the foot-controlled switch 110.

The stabilizing apparatus 106 includes an elongate shaft 116 and a foot-controlled switch retainer (also called herein a retainer or retaining member) 118. The elongate shaft 116 is a support structure that supports the retainer 118 and that removably attaches to the musical equipment stand 102. For at least some implementations, the elongate shaft 116 and/or the retainer 118 may be made of a relatively rigid and/or durable material, such as aluminum or other type of metal, plastic, or carbon fiber, as non-limiting examples.

Additionally, for at least some implementations, the elongate shaft 116 has an adjustable length that allows the elongate shaft 116 to attach and detach from the musical equipment stand 102. During assembly, the length of the elongate shaft 116 may be adjusted to a length that corresponds to a dimension, such as a width, of the musical equipment stand 102, so that the elongate shaft 116 as a suitable or optimal length to engage with and attach or coupled to the base 108 of the musical equipment stand 102. The elongate shaft 116 may have a length that is adjustable over a wide range of possible lengths to allow the stabilizing apparatus 106 to connect to and/or be compatible with any of various types and sizes of musical equipment stands 102.

In at least some implementations, the elongate shaft 116 includes a plurality of elongate shaft elements (or shaft members) 120 configured to move relative to each other that, in turn, can adjust, i.e., by expanding and contracting, the adjustable length of the elongate shaft 116. In particular of these implementations, the plurality of shaft elements 120 have a telescoping configuration or arrangement. For example, one shaft element is movably disposed within another of the shaft element in order to expand and contract the overall length of the elongate shaft 116. Other or additional configurations in other implementations are possible to enable the shaft elements 120 to move relative to each other to, in turn, adjust the overall length of the elongate shaft 116.

In addition, the elongate shaft 116 includes opposing ends 122, 124, each configured to removably attach to a respective portion 126, 128 of the base 108 of the musical equipment stand 102. In some implementations such as shown in FIGS. 1A, 1B, the portions 126, 128 include respective portions of feet or other parts of the base 108, such as those used to facilitate stability of the musical equipment stand 102 on the floor 112. The ends 122, 124 attach to the base 108 so that the retainer 118 defines the retaining area 114 for the foot-controlled switch 110 at or near a portion of the floor 112. Accordingly, during assembly, the ends 122, 124 are coupled to the respective base portions 126, 128 of the base 108. Adjusting the length of the elongate shaft 116 to a size corresponding to a dimension of the base 108 may, in turn, enable the ends 122, 124 to engage or couple to the respective base portions 126, 128.

FIGS. 2A-2D show various example configurations of an end, any of which may be representative of a configuration for one or both of the ends 122, 124. In each configuration, the end includes an engagement surface configured to engage or contact a respective portion 126, 128 of the base 108. In addition, for at least some implementations, each engagement surface may include or otherwise be covered by one or more layers of a non-slip material, such as rubber or foam, as non-limiting examples. The non-slip material increases the coefficient of friction of an end, that in turn increases the ability of the end to stay attached to (i.e., not move relative to) the respective base portion 126, 128 to which it is attached, including during situations where the end is being subject to forces caused by operation of the foot-controlled switch, which ultimately enhances the ability of the stabilizing apparatus 106 to provide a retaining area 114 that is stable.

Figure 2A:
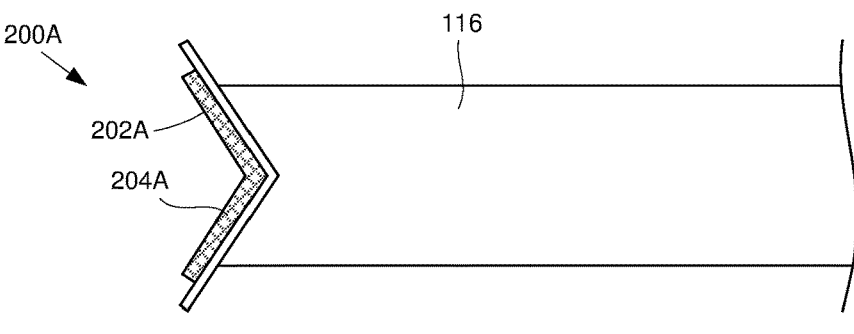
FIG. 2A is a side view of a first example configuration for an end of an elongate shaft of the stabilizing apparatus of FIGS. 1A and 1B.

Referring particularly to FIG. 2A, an end 200A has an open configuration with an engagement surface 202A that includes two generally flat or planar surface portions that meet to form an angle. In some implementations such as shown in FIG. 2A, the angle is 90 degrees, although other angles smaller or greater than 90 are possible. Also, as shown in FIG. 2A, a corner or vertex where the two surfaces meet is aligned with a central axis of the elongate shaft 116. FIG. 2A also shows the engagement surface 202A including a layer of non-slip material 204A.

Figure 2B:
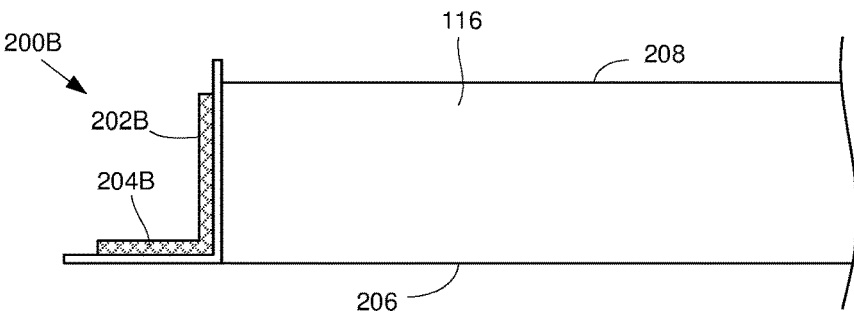
FIG. 2B is a side view of a second example configuration for an end of an elongate shaft of the stabilizing apparatus of FIGS. 1A and 1B.

Referring to FIG. 2B, an end 200B has a configuration similar to the configuration of the end 200A of FIG. 2A, in that it has an open configuration, with an engagement surface 202B that includes to generally flat or planar surface portions that meet to form an angle, and where the engagement surface 202B includes a non-slip material 204B. However, in contrast to the end 200A, the corner or vertex forming the angle in FIG. 2B, is aligned with a bottom surface 206 of the elongate shaft 116. Correspondingly, one of the planar surface portions is parallel with the bottom surface 206. As used herein, terms such as "top" and "bottom", as well as other similar terms like "above" and "below" are relative terms that refer to a positioning of components relative to the floor 112. For example, a component that is on "top" of another component is further away from the floor 112 than the other component. Likewise, a component that is to the "bottom" of another component is closer to the floor 112 than the other component. In this context, the bottom surface 206 of the elongate shaft 116 is a surface of the elongate shaft 116 that is closest to the floor 112 when the stabilizing apparatus 106 is attached to the musical equipment stand 102. Other similar implementations are possible. For example, in another implementation, the corner or vertex is aligned with a top surface 208 and/or one of the surface portions is parallel with the top surface 208.

Figure 2C:
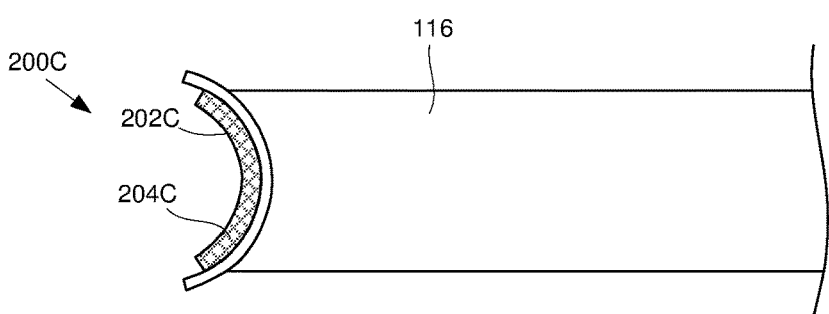
FIG. 2C is a side view of a third example configuration for an end of an elongate shaft of the stabilizing apparatus of FIGS. 1A and 1B.

Referring to FIG. 2C, an end 200C similarly has an open configuration, and includes an engagement surface 202C includes a layer of non-slip material 204C. However, in contrast to the ends 200A, 200B, the end 200C has a semi-circular shape.

Figure 2D:
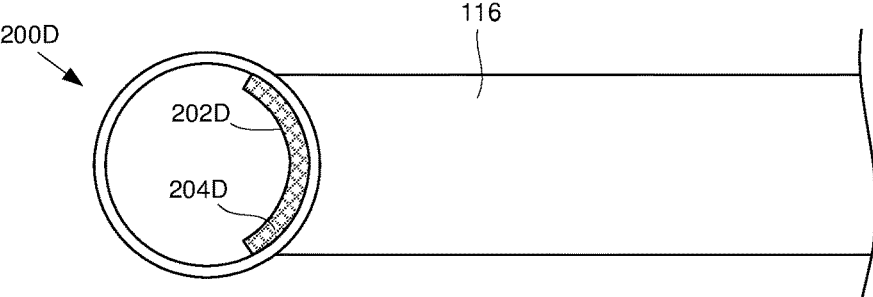
FIG. 2D is a side view of a fourth example configuration for an end of an elongate shaft of the stabilizing apparatus of FIGS. 1A and 1B.

Referring to FIG. 2D, an end 200D has a closed configuration, in contrast to the open configurations of ends 200A, 200B, 200C. With the closed configuration, the end 200D may completely surround a respective base portion 126, 128. The closed configuration of FIG. 2D has a circular shape, although other shapes may be possible. Similar to the open configurations of FIGS. 2A-2C, the end 200D has an engagement surface 202D that includes a layer of non-slip material 204D.

The end configurations 200A, 200B, 200C, 200D are merely exemplary and various of other open or closed configurations for the ends 122, 124 suitable for removably attaching to a base 108 of a musical equipment stand 102

Referring back to FIGS. 1A, 1B, the stabilizing apparatus 106 may further include a locking assembly 130 configured to lock the elongate shaft 116 in a locked position or configuration, and unlock the elongate shaft 116 (or at least two of the shaft elements 120) in an unlocked position or configuration. When the locking assembly 130 locks the elongate shaft 116, the locked position of the elongate shaft 116 prevents a user from adjusting the length of the elongate shaft 116. Additionally, when the locking assembly 130 unlocks the elongate shaft 116, the unlocked position of the elongate shaft 116 allows a user to adjust the length of the elongate shaft 116. Correspondingly, during assembly, when the length of the adjustable shaft 116 is adjusted to a desired (or final, optimal, or target) length corresponding to a dimension of the base 108, and the ends 122, 124 are coupled to respective base portions 126, 128, the locking assembly 130 may be manipulated to lock in place the length of the elongate shaft 116, facilitating the elongate shaft 116 to maintain a secure connection to the base 108.

The locking assembly 130 may include one or more locks 132, with each lock 132 configured to position a corresponding two shaft elements 120 in locked and unlocked positions. Correspondingly, when a given lock 132 locks a corresponding two shaft elements 120 in a locked position, the two shaft elements 120 are unable to move relative to each other to adjust the overall length of the elongate shaft 116. Additionally, when the given lock 132 unlocks the corresponding two shaft elements 120 in the unlocked position, the two shaft elements 120 are able to move relative to each other, such that the relative movement of those two shaft elements 120 can adjust the overall length of the elongate shaft 116.

Correspondingly, the locking assembly 130 may lock the elongate shaft 116 in a locked position when all of the one or more locks 132 lock their respective two shaft members 120 in locked positions. Additionally, when at least one of the one or more locks 132 is unlocked, then the locking assembly 130 unlocks the elongate shaft 116 in an unlocked position, since relative movement of at least two shaft members 120 can adjust the overall length of the elongate shaft 116.

Figure 3:
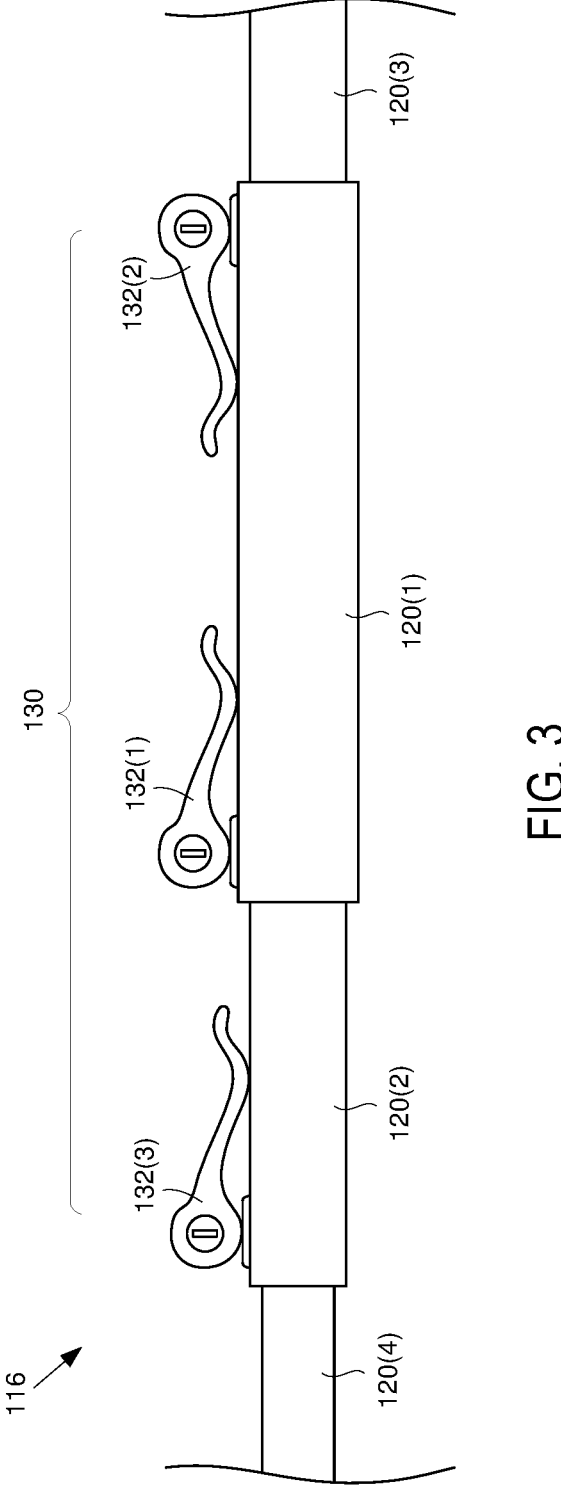
FIG. 3 is a side view of an example configuration of an elongate shaft of the stabilizing apparatus of FIGS. 1A and 1B, including four shaft members.

Additionally, in general, where the elongate shaft 116 includes an N-number of shaft elements 120, the locking assembly 130 includes an (N–1)-number of locks 132. Correspondingly, in some implementations, the elongate shaft 116 includes only two shaft members 120, in which case the locking assembly 130 may include only one lock 132 configured to control movement of the only two shaft members 120. In other implementations, the elongate shaft 116 includes at least three shaft members 120. FIG. 3 shows an example implementation of the elongate shaft 116 having four shaft members 120, including a first shaft member 120(1), a second shaft member 120(2), a third shaft member 120(3), and a fourth shaft member 120(4). For at least some of these implementations, the third and fourth shaft members 120(3), 120(4) function as extensions that provide further flexibility for adjusting the length of the elongate shaft 116, such as without having to increase the lengths of the other two shafts members 120(1), 120(2). Correspondingly, the example implementation in FIG. 3, the locking assembly 130 includes three locks 132, including a first lock 132(1) configured to control relative movement between the first and second shaft members 120(1), 120(2); a second lock 132(2) configured to control relative movement between the first and third shaft members 120(1), 120(3); and a third lock 132(3) configured to control relative movement between the second and fourth shaft members 120(2), 120(4).

Additionally, each lock 132 of the locking assembly 130 may be configured in any of various ways to control (i.e., allow or permit) relative movement for two corresponding shaft members 120. In some example implementations such as shown FIGS. 1A, 1B, and 3, a given lock 132 is in the form of a clamp that is configured to lock two shaft members 120 by clamping them together and unlock the two shaft members 120 by unclamping them.

Figure 4A:
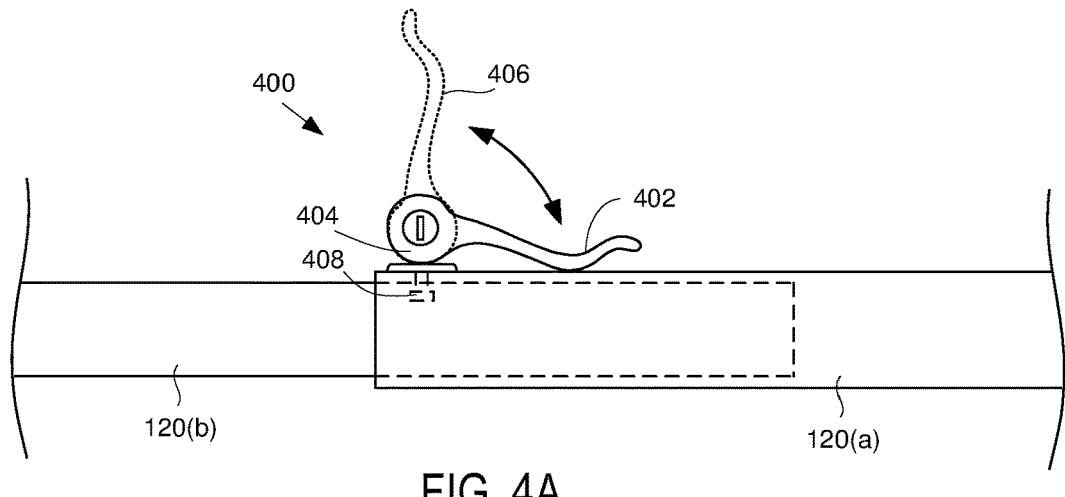
FIG. 4A is a side view of a first example configuration of a lock for two shaft members of an elongate shaft of the stabilizing apparatus of FIGS. 1A and 1B.

FIG. 4A shows an example configuration of a clamp 400 in further detail, which may be representative of a clamp configuration of the lock(s) 132 in FIGS. 1A, 1B, and 3. The clamp 400 may be configured to control movement of two shafts members 120(a), 120(b) of the elongate shaft 116. In FIG. 4A, the shaft member 120(a) is sized larger than the shaft member 120(*b*), such that the smaller shaft member 120(*b*) is configured to move within the larger shaft member 120(*a*). Additionally, in some implementations such as in FIG. 4A, the clamp 400 is positioned generally in the middle along the length of the two shaft members 120(*a*), 120(*b*), and/or located at or near an end of the larger shaft member 120(*a*), where the smaller shaft member 120(*b*) moves through the larger shaft member 120(*a*).

Additionally, in some implementations such as in FIG. 4A, the clamp 400 may include or is otherwise operated by a lever 402 of a cam mechanism 404 that can be moved between locked (or down) and unlocked (or raised) positions. In the locked (or down) position, the lever 402 selectively reduces an internal dimension of the space within the larger shaft member 120(*a*), thereby clamping the larger shaft member 120(*a*) to the smaller shaft member 120(*b*), and in turn preventing relative movement between the two shaft members 120(*a*), 120(*b*). Additionally, in the unlocked (or raised) position, as depicted by dotted line 406, the internal dimension of the space within the larger shaft member 120(*a*) is at a maximum, thereby unclamping the larger shaft member 120(*a*) from the smaller shaft member 120(*b*), and in turn permitting relative movement between the two shaft members 120(*a*), 120(*b*). In some implementations, the clamp 400, through use of the lever 402, is considered or functions as a "snap lock" in that the lever "snaps down" into the locked position to lock in place the two shaft members 120(*a*), 120(*b*). Additionally, in some implementations, the cam mechanism 404 includes or is otherwise operatively coupled to a screw 408 or other similar structure to selectively control the internal dimension of the space within the larger shaft member 120(*a*) by way of the lever 402.

Figure 4B:
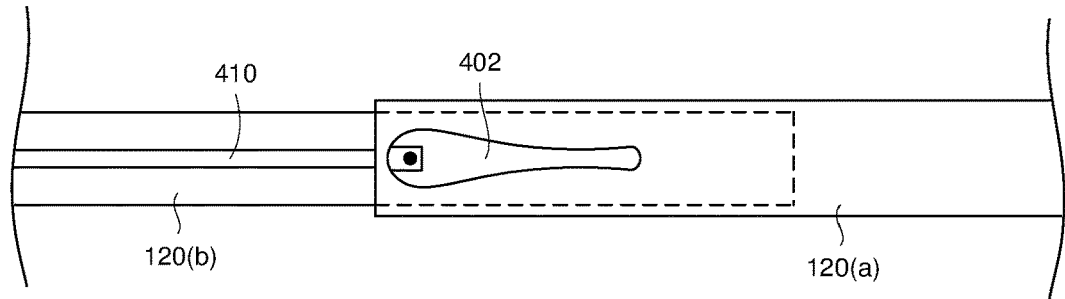
FIG. 4B is a top view of the first example lock configuration of FIG. 4A.

FIG. 4B shows a top view of a further example implementation of the two shaft members 120(*a*), 120(*b*) with the clamp 400 of FIG. 4A. In some implementations such as in FIG. 4B, the smaller shaft member 120(*b*) includes a channel or groove 410 disposed or cut in an outer surface of the smaller shaft member 120(*b*). The channel 410 is aligned with the screw 408, providing a track or guide for the screw 408 to facilitate relative movement of the two shaft members 120(*a*), 120(*b*) when the clamp 400 is unlocked, and to provide a surface for the screw 408 to engage when the clamp 400 is locked.

Figure 5A:
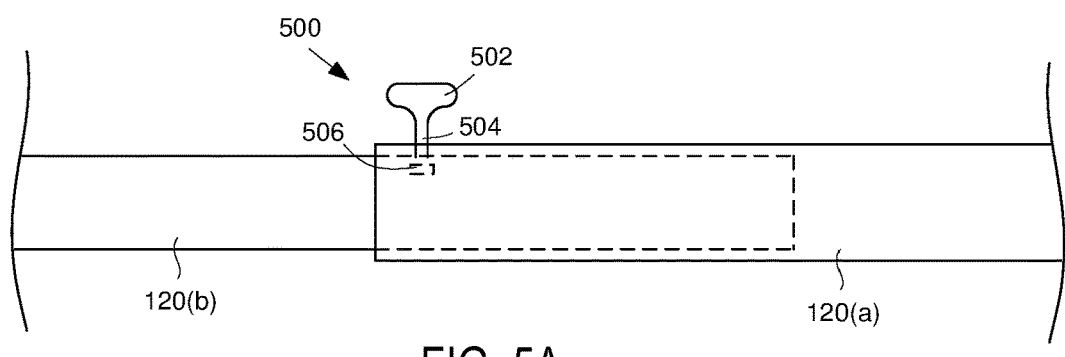
FIG. 5A is a side view of a second example configuration of a lock for two shaft members of an elongate shaft of the stabilizing apparatus of FIGS. 1A and 1B.

FIG. 5A shows another example configuration of a clamp 500, which may be representative of an alternative configuration of the lock(s) 132 in FIGS. 1A, 1B, and 3. Similar to the clamp 400, the clamp 500 may be configured to control movement of two shaft members 120(*a*), 120(*b*), including a larger shaft member 120(*a*) and a smaller shaft member 120(*b*) configured to move within the larger shaft member 120(*a*). Additionally, similar to the clamp 400, the clamp 500 is positioned generally in the middle along the length of the two shaft members 120(*a*), 120(*b*), and/or located at or near an end of the larger shaft member 120(*a*), where the smaller shaft member 120(*b*) moves through the larger shaft member 120(*a*).

Additionally, in some implementations such as in FIG. 5A, the clamp 500 may include or is otherwise operated by a knob 502 of a screw mechanism 504 that can be moved between locked (or down) and unlocked (or raised) positions. For at least some of these implementations, the knob 502 is tightened to move the clamp 500 to the locked position, which selectively reduces an internal dimension of the space within the larger shaft member 120(*a*), thereby clamping the larger shaft member 120(*a*) to the smaller shaft member 120(*b*), and in turn preventing relative movement between the two shaft members 120(*a*), 120(*b*). Additionally, the knob 502 is loosened to move the clamp 500 to the unlocked position, which increases the internal dimension of the space within the larger shaft member 120(*a*) to a maximum, thereby unclamping the larger shaft member 120(*a*) from the smaller shaft member 120(*b*), and in turn permitting relative movement between the two shaft members 120(*a*), 120(*b*). In some implementations, similar to the clamp 400, the screw mechanism includes or is otherwise operatively coupled to a screw 506 or other similar structure to selectively control the internal dimension of the space within the larger shaft member 120(*a*) by way of the lever knob.

Figure 5B:
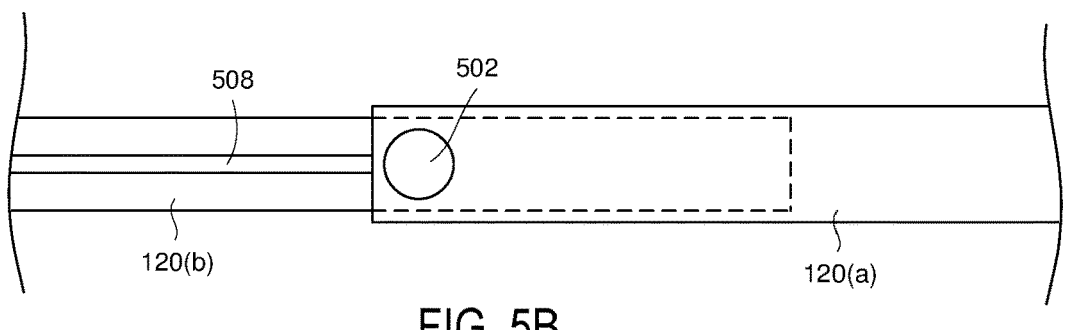
FIG. 5B is a top view of the second example lock configuration of FIG. 5A.

FIG. 5B shows a top view of a further example implementation of the two shaft members 120(*a*), 120(*b*) with the clamp 500 of FIG. 5A. Similar to the configuration in FIG. 4B, in some implementations, the smaller shaft member 120(*b*) includes a channel or groove 508 disposed or cut in an outer surface of the smaller shaft member 120(*b*). The channel 508 is aligned with the screw 506, providing a track or guide for the screw 506 to facilitate relative movement of the two shaft members 120(*a*), 120(*b*) when the clamp 500 is unlocked, and to provide a surface for the screw 506 to engage when the clamp 500 is locked.

The clamp configurations in FIGS. 4A-5B are merely examples, and other clamp configurations are possible. For example, other clamp configurations may not necessarily utilize a screw to radially move to clamp and unclamp the smaller shaft member 120(*b*) to the larger shaft member 120(*a*). In addition or alternatively, other clamp configurations may utilize a collar or other similar structure to adjust the dimension of the internal space of the larger shaft member 120(*a*) to perform the clamping. Any of various clamping techniques may be implemented to control the relative movement between two shaft members 120. Other configurations for a lock 132, besides use of a clamp, to control relative movement of two shaft members 120 are also possible. For example, in other configurations, a lock 132 may include a series of holes and a button. That is, the larger shaft member 120(*a*) may include a series of holes, and the smaller shaft member 120(*b*) may include a spring-loaded and/or depressible button. To unlock the two shaft members 120(*a*), 120(*b*), the button may be depressed such that the button is not within any of the holes, thereby permitting relative movement between the two shaft members 120(*a*), 120(*b*). Additionally, when the button is aligned with one of the holes, the button may "spring" into the hole, thereby locking the two shaft members 120(*a*), 120(*b*) and/or preventing their relative movement. Various ways of implementing a locking feature to control relative movement between two shaft members 120 are possible.

Referring back to FIGS. 1A, 1B, during assembly, the length of the elongate shaft 116 may be increased to a sufficient length so that the ends 122, 124 engage with their respective base portions 126, 128. In some implementations, the length may be set so that the ends 122, 124 press against or otherwise bias the respective base portions 126, 128 with sufficient force to withstand other forces caused by operation of the foot-controlled switch 110 that would otherwise cause the ends 122, 124 to move relative to the base portions 126, 128. As mentioned, the non-slip material may further facilitate the ability of the ends 122, 124 securely attach their respective base portions 126, 128, and in turn withstand movement.

Still referring to FIGS. 1A, 1B, in some implementations, the retainer 118 includes a pair of legs 134, including a first leg 134(*a*) and a second leg 134(*b*), that extend or project from, such as outwardly from or relative to, the elongate shaft 116, and/or extend in a direction generally perpendicular to a length direction of the elongate shaft 116. In some implementations such as in FIGS. 1A, 1B, each of the legs 134 have an L-shaped cross-section defined by two flat or planar portions that form a right angle, including a side wall 136 and a base (or base portion) 138. The side walls 136 may partially define the retaining area 114. A portion 140 of an outer surface 142 (e.g., a side surface) of the elongate shaft 116 may further define the retaining area 114, and serve as a back wall or backstop for the foot-controlled switch 110. During assembly, once the stabilizing apparatus 106 is attached to the musical equipment stand 102, the foot-controlled switch 110 may be positioned in the retaining area 114 between the two side walls 136 of the two legs 134.

Additionally, in some implementations, the retainer 118 may be movable between a deployed position and an unde-ployed position. FIGS. 1A, 1B show the retainer 118 in the deployed position. In the deployed position, the retainer 118 defines the retaining area 114 for positioning of the foot-controlled switch 110. In the undeployed position, the retainer 118 is collapsed or folded relative to the elongate shaft 116, or is otherwise in a position that reduces the overall width of the stabilizing apparatus 106 so that the width of the stabilizing apparatus 106 matches or is defined by the width of the elongate shaft 116. For at least some implementations where the retainer 118 is moveable between deployed and undeployed positions, the stabilizing apparatus 106 includes at least one pivot that provides a pivotable coupling between the elongate shaft 116 and the retainer, and that allows the retainer 118 to pivot (or pivot-ably move) relative to the elongate shaft 116.

Figure 6:
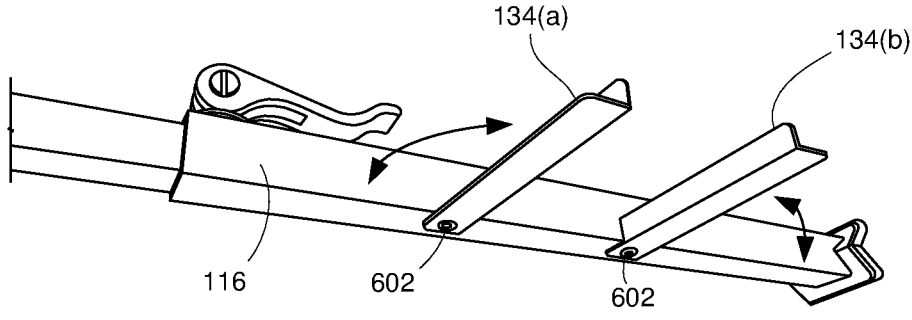
FIG. 6 is a perspective view of a portion of an elongate shaft of the stabilizing apparatus of FIGS. 1A and 1B, illustrating a pivotable engagement between the elongate shaft and legs of a retainer.
Figure 7:
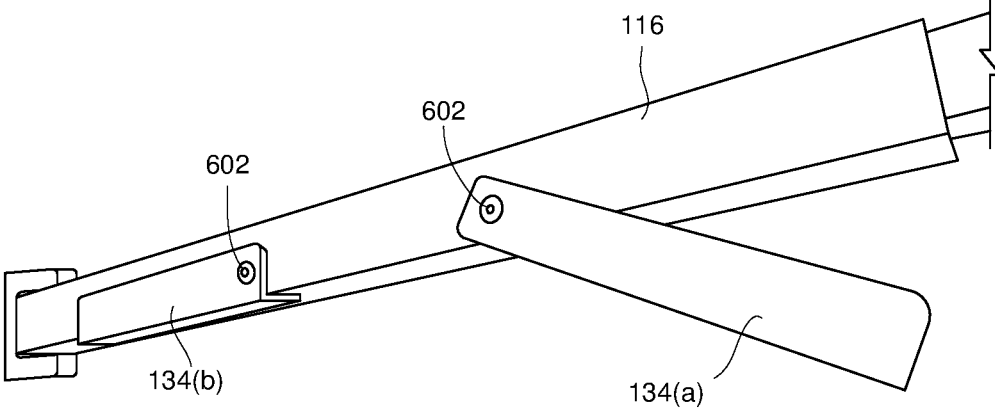
FIG. 7 is another perspective view of a portion of an elongate shaft of the stabilizing apparatus of FIGS. 1A and 1B, further illustrating the pivotable engagement between the elongate shaft and legs of a retainer.

Referring to FIGS. 6 and 7, in some implementations where the retainer 118 is configured to move between deployed and undeployed positions, the legs 134 are each individually or separately movable relative to each other and to the elongate shaft 116 via a respective pivot (or pivot rivet) 602. FIG. 6 shows the legs 134 coupled to the elongate shaft 116 via respective pivots 602, and in respective deployed positions. FIG. 7 shows the second leg 134(*b*) in the undeployed position, and the first leg 134(*a*) between the deployed and undeployed positions. As shown in FIG. 7, in the undeployed position, the second leg 134(*b*) extends substantially parallel with the length of the elongate shaft 116.

As mentioned, in the configuration shown in FIGS. 1A, 1B, 6, and 7, the legs 134 each have an L-shape. Other configurations are possible in any of various other imple-mentations. For example, in some other implementations, one or both of the legs 134 does not include a side wall 136. That is, a given leg 134 includes the base portion 138 without the side wall 136. In some of these implementations, the legs 134 are spaced apart from each other such that one or both of the base portions 138 are part of the retaining area 114. That is, a foot-controlled switch 110 rests on top of the planar surface of one or both of the base portions 138. In other implementations, the legs 134 are spaced apart from each other such that the foot-controlled switch 110 is dis-posed between both base portions 138, as in the configura-tion in FIGS. 1A, 1B.

As mentioned, configuring the legs 134, or the retainer 118 as a whole, in the undeployed position may desirably minimize an overall width of the stabilizing apparatus 106, which may enhance the portability and/or transportability of the stabilizing apparatus 106, and/or which may desirably increase the durability of the stabilizing apparatus. Such features may be especially advantageous during situations when the stabilizing apparatus 106 is being moved, such as when the stabilizing apparatus 106 is being transported in a vehicle and/or is otherwise being moved from one musical performance location to another musical performance loca-tion. Correspondingly, during setup or assembly, if the legs 134 are in the undeployed (or at least not in the deployed) position, each of the legs 134 may be moved to their respective deployed positions in order to define the retaining area 114 in which the at least one foot-controlled switch 110 may then be positioned.

Figures 8, 9:
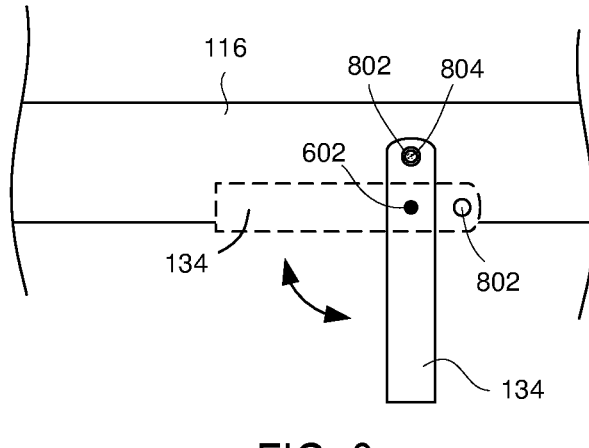
FIG. 8 shows a side view of a portion of an elongate shaft of the stabilizing apparatus of FIGS. 1A and 1B, illustrating a first example implementation of a control mechanism that controls movement of movable legs of a retainer.
FIG. 9 shows a side view of a portion of an elongate shaft of the stabilizing apparatus of FIGS. 1A and 1B, illustrating a second example implementation of a control mechanism that controls movement of movable legs of a retainer.

In addition or alternatively, in some implementations, the stabilizing apparatus 106 may include one or more control mechanisms that controls or restricts movement of one or both of the leg 134 to enhance the ability of the leg(s) 134 to be in the deployed position. FIG. 8 shows an example implementation of a control mechanism in the form a locking mechanism that includes a hole 802 and a depress-ible button 804. The hole 802 is positioned at an end of the leg 134 (e.g., at an end of the base portion 138), and the depressible button 804 is positioned on the elongate shaft 116. As shown in FIG. 8, when the leg 134 is in the undeployed position (as indicated by the dashed lines), the hole 802 and the button 804 are unaligned with each other, permitting the leg 134 to pivotably move about the pivot 602. Additionally, when the leg 134 is in the deployed position (as indicated by solid lines), the hole 802 and the button 804 are aligned, causing the button 804 to "spring" into the hole 802, thereby preventing the leg 134 from pivotably moving out of the deployed position. Thereafter, the button 804 can be depressed to permit movement of the leg 134.

FIG. 9 shows another example implementation of a con-trol mechanism in the form of a stop, such as a tab or other similar structure, 902 positioned on the elongate shaft 116 that restricts the pivotable movement of the leg 134. As shown in FIG. 9, the tab 902 may prevent the leg 134 from moving beyond the deployed position (shown using solid lines), such as by preventing the leg 134 from moving to a position where an angle θ defined by the leg 134 and the side surface 142 is greater than a predetermined value, such as 90 degrees.

The control mechanisms shown in FIGS. 8 and 9 are merely examples, and various other types of control mecha-nisms that restrict and/or control movement of one or both of the legs 134 between the deployed and undeployed positions are possible.

Figure 10:
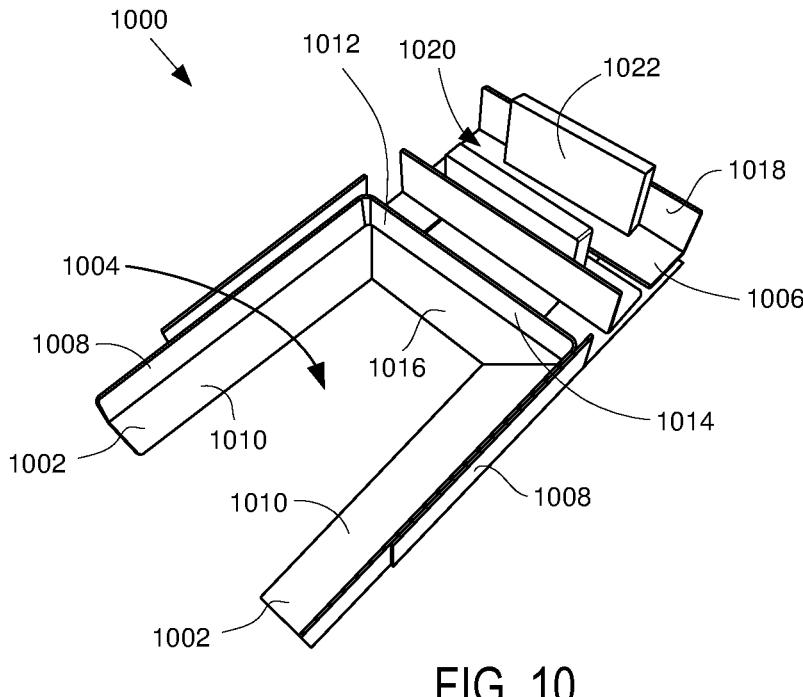
FIG. 10 shows a perspective view of another implementation of a retainer for the stabilizing apparatus of FIGS. 1A and 1B.

FIG. 10 shows another configuration of a retainer 1000 that may be used instead of the retainer 118 including legs 134 shown in FIGS. 1A, 1B, 6-9. In the example retainer configuration in FIG. 10, the retainer 1000 may similarly include a pair of legs 1002 at least partially defining a retaining area 1004 in which at least one foot-controlled switch 110 (not shown in FIG. 10) may be retained. How-ever, instead of the legs 1002 being directly coupled to the elongate shaft 116, such as via the pivot(s) 602, as with the configuration of the legs 134 of the retainer 118, the legs 1002 are coupled to a coupling portion 1006, which couples to the elongate shaft 116, in turn coupling the legs 1002 and the retainer 1000 as a whole, to the elongate shaft 116.

As shown in FIG. 10, each of the legs 1002 may include a sidewall 1008 and a base (or base portion) 1010. In this configuration, the base portions 1010 form part of the retaining area 1004, such that the foot-controlled switch 110 (not shown in FIG. 10) rests or is disposed on the base portions 1010 when positioned in the retaining area 1004. Similar to the side walls 136, the sidewalls 1008 may restrain the foot-controlled switch 110 from moving laterally—i.e., parallel with the length direction of the elongate shaft 116. Additionally, the legs 1002 may be coupled to a backstop 1012 including a backwall 1014 that further defines the retaining area 1004, and that prevents movement of the foot-controlled switch 110 in a direction perpendicular to the length direction of the elongate shaft 116. In some implementations such as in FIG. 10, the backstop 1012 includes a base portion 1016 generally perpendicular to the backwall 1014 and positioned generally in the same geometric plane as the base portions 1010 so as to, like the base portions 1010, extend in and/or form part of the retaining area 1004. In this way, the sidewall base portions 1010 and the backwall base portion 1016 forms a platform for the foot-controlled switch 110 within the retaining area 1004. In some implementation, the planar surfaces of the base portions 1010, 1016 forming the platform may include or otherwise be covered with a non-slip material to further enhance the retention of the foot-controlled switch 110 within the retaining area 1004.

Various other configurations for the legs 1002 and/or the backstop 1012 are possible. For example, in other configurations, the legs 1002 only include sidewalls 1008 or only include base portions 1010. In addition or alternatively, in other configurations, the backstop 1012 does not include a base portion 1016.

Additionally, in some implementations such as in FIG. 10, the backstop 1012 is spaced apart from the coupling portion 1006 by a certain gap or distance, which may desirably provide sufficient spacing between the foot-controlled switch 110 and the elongate shaft 116 for an initial portion of cabling connected to and extending from the foot-controlled switch 110 to be positioned or disposed. From the spacing, the cabling may extend laterally and/or upward to the musical instrument 104 (FIG. 1A). Other implementations may not space apart the coupling portion 1006 and the backstop 1012—i.e., the backstop 1012 is in contact with the coupling portion 1006.

Additionally, as shown in FIG. 10, for at least some implementations, the coupling portion 1006 is a partial or semi-tubular structure having an inner surface 1018 defining a channel 1020 in which a portion of the elongate shaft 116 is disposed when the retainer 1000 is coupled to the elongate shaft 116. For at least some implementations, the coupling portion 1006 provides a removable coupling between the elongate shaft 116 and the retainer 1000. Also, in some implementations such as shown in FIG. 10, a padding 1022 or other similar structure may be positioned on the inner surface 1018 within the channel 1020, which may enhance the coupling between the coupling portion 1006 and the elongate shaft 116, such as by providing a more snug or friction fit for the portion of the elongate shaft 116 within the channel 1020, dampening movement or rattling of the portion of the elongate shaft 116 within the channel 1020 that would otherwise be caused when the foot-controlled switch 110 is being operated, and/or reducing wear that may otherwise be caused by friction between the elongate shaft 116 and the inner surface 1018.

Figure 11:
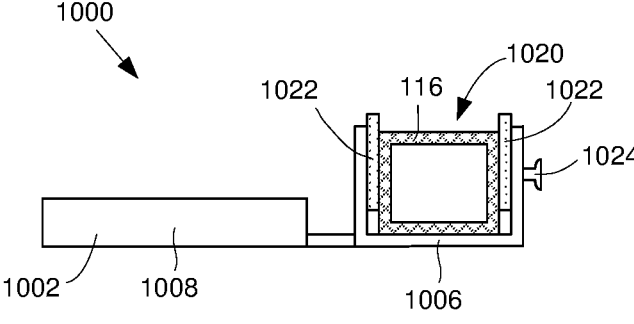
FIG. 11 shows a side view of the retainer of FIG. 10.

FIG. 11 shows a side view of the retainer 1000 coupled to elongate shaft 116, illustrating the elongate shaft in cross-section. In some implementations, the retainer 1000 may include a locking mechanism 1024 that can secure the portion of the elongate shaft 116 in the channel 1020. As shown in FIG. 11, the locking mechanism 1024 may be in the form knob, bolt, or screw, although any of various other types of locking mechanisms may be possible. Other implementations may not utilize a locking mechanism, including those where the coupling between the coupling portion 1006 and the elongate shaft 116 is sufficient without one.

As previously described, the retainer 118, 1000 defines a retaining area 114, 1004 in which at least one foot-controlled switch 110 may be stably retained or disposed. As previously described and such as shown in FIG. 1A, in some implementations or musical setups, only one foot-controlled switch 110 may be retained within the retaining area 114, 1004 at a given point in time. For other implementations or musical setups, multiple (one than one) foot-controlled switches 110 may be simultaneously retained within the retaining area 114, 1004 at a given point in time. For at least some of these implementations, the legs 134 or 1002 are sufficiently spaced apart from each other to accommodate a total size needed for simultaneously retaining multiple foot-controlled switches 110.

Referring to FIGS. 12A, 12B, in some implementations, the stabilizing apparatus 106 may include a bridge 1202 that extends across or over a pair of legs 1204, i.e., from one leg 1204(a) to another leg 1204(b). The pair of legs 1204 may be representative of the legs 134 or the legs 1002, or at least their respective base portions 138, 1010. FIG. 12A shows a side view of the bridge 1202 extending across or over the legs 1204. FIG. 12B shows a top view of an example implementation of the bridge 1202. The bridge 1202 may include at least one elongate member 1206 that extends from one leg 1204(a) to the other leg 1204(b). In some implementations such as in FIG. 12B, the bridge 1202 includes multiple elongate members 1206 spaced apart from each other. In other implementations, the bridge 1202 may be a single, continuous planar structure that extends over a substantial length of the legs 1204. Various ways of configuring a bridge that extends from one leg to another leg are possible.

Referring to FIG. 12C, in some implementations, the bridge 1202 is removably attachable to the legs 1204. In this context, the bridge 1202 functions as an attachment piece to the legs 1204 and/or generally for the retainer. For example, the bridge 1202 may include one surface or layer of a hook-and-loop fastener material 1208, and the legs 1204 may include a second, complementary surface or layer of the hook-and-loop fastener material 1210. The bridge 1202 is removably attachable to the legs 1204 via the first and second surfaces of the hook-and-loop fastener material 1208, 1210.

FIGS. 13A and 13B show another example configuration of a bridge 1302. In the example configuration shown in FIGS. 13A, 13B, the bridge 1302 has an adjustable width by being movable between collapsed and expanded positions. FIG. 13A shows the bridge 1302 in the collapsed position, and FIG. 13B shows the bridge 1302 in the expanded position. In the collapsed position, the bridge 1302 has its smallest width, and in the expanded position, the bridge 1302 has its largest width. By having an adjustable width, the bridge 1302 may be flexibly sized to accommodate different sized foot-controlled switches 110 and/or different arrangements or configurations of multiple foot-controlled switches 110.

In some implementations such as in FIGS. 13A, 13B, the bridge 1302 may include a first set of elongate members 1304 and a second set of elongate members 1306 that are movable (e.g., slidable) relative to each other to expand and collapse the bridge 1302. Various ways of configuring the first and second sets 1304, 1306 to be movable relative to each other are possible. For example, the first and second sets 1304, 1306 may be telescoping elements relative to each other. In addition or alternatively, one of the first and second sets 1304, 1306 may pins projecting from their side surfaces, and the other of the first and second sets 1304, 1306 may have grooves or tracks to accommodate the pins and through which the pins slide. Notches or other similar structures may be positioned in the grooves to allow for incremental movement, and in turn incremental adjustment of the width. Various other ways to enable the first and second sets 1304, 1306 to move or slide relative to each other so as to provide a bridge having an adjustable width are possible. Also, in some implementations, similar to the bridge 1202, the adjustable-width bridge 1302 may be configured to be removably attachable to legs of a retainer, such as by being configured with a hook-and-loop fastener material as implemented in FIG. 12C, as a non-limiting example.

Use of a bridge with foot-controlled switch stabilizing apparatus, such as the bridge 1202, 1302, may be particularly useful or utilized for implementations including multiple foot-controlled switches 110, such that the multiple foot-controlled switches 110 are disposed on and/or are supported by a common surface or platform. However, various other implementations utilizing only a single foot-controlled switch 110 may similarly utilize a bridge, such as the bridge 1202, 1302.

Additionally, in the implementations described thus far, the retaining area 114, 1004 is generally flat, at least in the sense that the retaining area 114, 1004 is either part of the floor 112 or is a platform, formed by one or more surfaces of base portions 138, 1010, 1016, parallel with the floor 112. In other embodiments, a surface of a retaining area for the at least one foot-controlled switch 110 is inclined—i.e., the retaining area surface and the floor 112 form an angle greater than zero and less than 90 degrees, such as 15 degrees, 30 degrees, or 45 degrees as non-limiting examples. In some implementations having an inclined surface, the legs of the retainer are each configured as a wedge providing an inclined surface.

Figure 14:
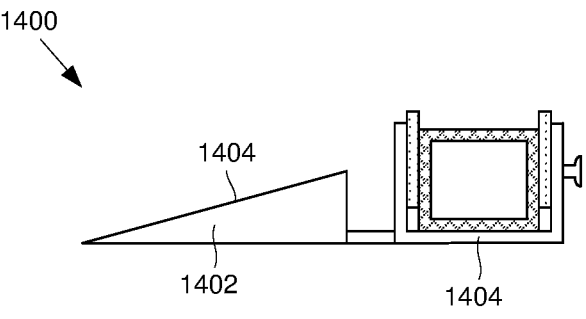
FIG. 14 shows a side view of another implementation of a retainer, with legs providing an inclined surface.

FIG. 14 shows a side view of an example configuration of a retainer 1400 that includes leg 1402 having and/or providing inclined surfaces 1404 on which at least one foot-controlled switch 110 may be disposed. FIG. 14 shows the legs 1402 configured as a wedge or otherwise having a wedge shape, although other implementations for providing an inclined surface are possible. Also, as shown in FIG. 14, besides the legs 1402 providing inclined surfaces, the retainer 1400 otherwise has a similar configuration as the retainer 1000 shown in FIGS. 10 and 11. For example, in the retainer 1400, the legs 1402 are coupled to a coupling portion 1406, similar to the retainer 1000. Other configurations of a retainer having legs providing an inclined surface are possible. For example, some other implementations of a retainer may include movable legs, such as the legs 136 in FIGS. 1A, 1B, 6, 7, that provide inclined surfaces relative to the floor 112.

Figure 15:
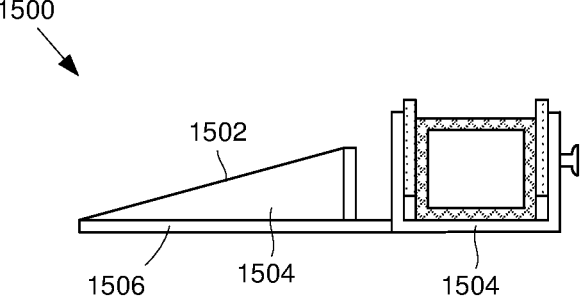
FIG. 15 shows a side view of another implementation of a retainer, coupled to a bridge providing an inclined surface.

FIG. 15 shows a side view of another example configuration of a retainer 1500 providing an inclined surface 1502. For the configuration in FIG. 15, instead of having legs providing the inclined surfaces, the retainer configuration in FIG. 15 has or utilizes a bridge 1504 to provide the inclined surface. For example, the retainer 1500 may have a configuration similar to the configuration of the retainer 1000 in FIGS. 10 and 11, including having legs 1506 having the same configuration as the legs 1002, or at least providing a surface parallel with the floor 112, similar to the base portions 1010 of FIGS. 10 and 11. Additionally, as shown in FIG. 15, the legs 1506 are coupled to a coupling portion 1508, like the retainer 1000 in FIGS. 10 and 11. However, in the implementation in FIG. 15, a wedge-shaped (or other similar shaped) bridge 1504 providing the inclined surface 1502 may be positioned on the legs 1506, and in turn at least one foot-controlled switch 110 may be positioned on the inclined surface 1502. In any of various configurations, the bridge 1504 may be removably attachable to the legs 1506, such as by including hook-and-loop fastener material similar to the configuration in FIG. 12C, as a non-limiting example.

The subject matter of the present description may also relate, among others, to the following aspects:

In a first aspect, includes a stabilizing apparatus for a foot-controlled switch configured to control a musical instrument. The stabilizing apparatus comprises: an elongate shaft having an adjustable length, the elongate shaft extending from a first end to a second end, wherein the first end is configured to engage with a first portion of a base of a musical equipment stand, and the second end is configured to engage with a second portion of the base of the musical equipment stand; and a retainer defining a retaining area for the foot-controlled switch, the retainer coupled to and extending from the elongate shaft.

A second aspect includes the first aspect, and further includes wherein the elongate shaft comprises a plurality of shaft elements configured to move relative to each other to expand and contract the adjustable length.

A third aspect includes the second aspect, and further includes wherein the plurality of shaft elements have a telescoping configuration.

A fourth aspect includes any of the second or third aspects, and further includes a locking assembly configured to lock the plurality of shaft elements in a locked position, and unlock the plurality of shaft elements in an unlocked position.

A fifth aspect includes any of the second through fourth aspects, and further includes wherein the plurality of shaft elements comprise at least three shaft elements.

A sixth aspect includes any of the first through fifth aspects, and further includes wherein each of the first end and the second end comprises an engagement surface including a non-slip material.

A seventh aspect includes any of the first through sixth aspects, and further includes wherein the retainer comprises a pair of legs spaced apart from each other.

An eighth aspect includes the seventh aspect, and further includes wherein the retainer further comprises a coupling portion configured to couple to the elongate shaft, the coupling portion comprising a semi-tubular structure having an inner surface defining a channel in which a portion of the elongate shaft is disposed.

A ninth aspect includes the seventh aspect, and further includes at least one pivot, wherein the retainer is coupled to the elongate shaft via the at least one pivot, and is movable between a deployed position and undeployed position via the at least one pivot.

A tenth aspect includes the ninth aspect, and further includes wherein the pair of legs extend substantially perpendicular to the adjustable length of the elongate shaft in the deployed position and substantially parallel to adjustable length of the elongate shaft in the undeployed position.

An eleventh aspect includes any of the ninth or tenth aspects, and further includes wherein the at least one pivot comprises a plurality of pivots, and the pair of legs are individually movable relative to each other via a respective one of the plurality of pivots.

A twelfth aspect includes any of the seventh through eleventh aspects, and further includes a bridge extending from one of the pair of legs to an other of the pair of legs.

A thirteenth aspect includes the twelfth aspect, and further includes wherein the bridge comprises an adjustable width, the bridge comprising a first set of elongate members and a second set of elongate members movable relative to each other to provide the adjustable width.

A fourteenth aspect includes any of the twelfth or thirteenth aspects, and further includes wherein the bridge is removably attachable to the pair of legs.

A fifteenth aspect includes a musical system that includes any of the first through fourteenth aspects, and further includes at least one of: a musical equipment stand, a musical instrument, or at least one foot-controlled switch.

A sixteenth aspect includes a method of assembling musical equipment, the method comprising: adjusting a length of an elongate shaft to correspond to a dimension of a base of a musical equipment stand; and coupling a first end of the elongate shaft to a first portion of the base and a second end of the elongate shaft to a second portion of the base, wherein a retainer for a foot-controlled switch is coupled the elongate shaft and positioned between the first and second portions of the base upon coupling the first end to the first portion of the base and the second end to the second portion of the base, the retainer defining a retaining area for positioning of the foot-controlled switch; and positioning the foot-controlled switch in the retaining area defined by the foot-controlled switch.

A seventeenth aspect includes the sixteenth aspect, and further includes: locking the elongate shaft in a locked position upon adjusting the length to a target length corresponding to the dimension of the base.

An eighteenth aspect includes any of the sixteenth or seventeenth aspects, and further includes: pivotably moving the retainer from an undeployed position to a deployed position.

A nineteenth aspect includes the eighteenth aspect, and further includes wherein pivotably moving the retainer from the undeployed position to the deployed position comprises individually pivotably moving a pair of legs of the retainer from respective undeployed positions to respective deployed positions.

A twentieth aspect includes any of the sixteenth or seventeenth aspects, and further includes: positioning a portion of the elongate shaft in a channel defined by a coupling portion of the retainer.

A twenty-first aspect includes any of the sixteenth through twentieth aspects, and further includes: attaching a bridge to legs of the retainer.

In addition to the features mentioned in each of the independent aspects enumerated above, some examples may show, alone or in combination, the optional features mentioned in the dependent aspects and/or as disclosed in the description above and shown in the figures.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

18

The invention claimed is:

1. A stabilizing apparatus for a foot-controlled switch configured to control a musical instrument, the stabilizing apparatus comprising:
an elongate shaft having an adjustable length, the elongate shaft extending from a first end to a second end, wherein the first end is configured to engage with a first portion of a base of a musical equipment stand, and the second end is configured to engage with a second portion of the base of the musical equipment stand; and
a retainer defining a retaining area for the foot-controlled switch, the retainer coupled to and extending from the elongate shaft,
wherein the retainer comprises:
a pair of legs spaced apart from each other; and
a coupling portion configured to couple to the elongate shaft, the coupling portion comprising a semi-tubular structure having an inner surface defining a channel in which a portion of the elongate shaft is disposed.

2. The stabilizing apparatus of claim 1, wherein the elongate shaft comprises a plurality of shaft elements configured to move relative to each other to expand and contract the adjustable length.

3. The stabilizing apparatus of claim 2, wherein the plurality of shaft elements have a telescoping configuration.

4. The stabilizing apparatus of claim 2, further comprising a locking assembly configured to lock the plurality of shaft elements in a locked position, and unlock the plurality of shaft elements in an unlocked position.

5. The stabilizing apparatus of claim 2, wherein the plurality of shaft elements comprise at least three shaft elements.

6. The stabilizing apparatus of claim 1, wherein each of the first end and the second end comprises an engagement surface including a non-slip material.

7. The stabilizing apparatus of claim 1, further comprising: at least one pivot,
wherein the retainer is coupled to the elongate shaft via the at least one pivot, and is movable between a deployed position and undeployed position via the at least one pivot.

8. The stabilizing apparatus of claim 7, wherein the pair of legs extend substantially perpendicular to the adjustable length of the elongate shaft in the deployed position and substantially parallel to adjustable length of the elongate shaft in the undeployed position.

9. The stabilizing apparatus of claim 7, wherein the at least one pivot comprises a plurality of pivots, and wherein the pair of legs are individually movable relative to each other via a respective one of the plurality of pivots.

10. The stabilizing apparatus of claim 7, further comprising a bridge extending from one of the pair of legs to an other of the pair of legs.

11. The stabilizing apparatus of claim 10, wherein the bridge comprises an adjustable width, the bridge comprising a first set of elongate members and a second set of elongate members movable relative to each other to provide the adjustable width.

12. The stabilizing apparatus of claim 10, wherein the bridge is removably attachable to the pair of legs.

13. A method of assembling musical equipment, the method comprising:
adjusting a length of an elongate shaft to correspond to a dimension of a base of a musical equipment stand; and
coupling a first end of the elongate shaft to a first portion of the base and a second end of the elongate shaft to a second portion of the base, wherein a retainer for a foot-controlled switch comprises a pair of legs spaced apart from each other, and a coupling portion configured to couple to the elongate shaft, wherein the coupling portion is coupled to the elongate shaft upon coupling the first end to the first portion of the base and the second end to the second portion of the base, the retainer defining a retaining area for positioning of the foot-controlled switch, and wherein the coupling portion comprises a semi-tubular structure having an inner surface defining a channel in which a portion of the elongate shaft is disposed; and positioning the foot-controlled switch in the retaining area defined by the foot-controlled switch.

14. The method of claim 13, further comprising:

locking the elongate shaft in a locked position upon adjusting the length to a target length corresponding to the dimension of the base.

15. The method of claim 13, further comprising:

pivotably moving the retainer from an undeployed position to a deployed position.

16. The method of claim 15, wherein pivotably moving the retainer from the undeployed position to the deployed position comprises individually pivotably moving a pair of legs of the retainer from respective undeployed positions to respective deployed positions.

17. The method of claim 13, further comprising: positioning a portion of the elongate shaft in a channel defined by a coupling portion of the retainer.

18. The method of claim 13, further comprising: attaching a bridge to legs of the retainer.

19. A stabilizing apparatus for a foot-controlled switch configured to control a musical instrument, the stabilizing apparatus comprising:

an elongate shaft having an adjustable length, the elongate shaft extending from a first end to a second end, wherein the first end is configured to engage with a first portion of a base of a musical equipment stand, and the second end is configured to engage with a second portion of the base of the musical equipment stand;

a retainer defining a retaining area for the foot-controlled switch, the retainer coupled to and extending from the elongate shaft, wherein the retainer comprises a pair of legs spaced apart from each other; and a bridge extending from one of the pair of legs to an other of the pair of legs, wherein the bridge comprises an adjustable width, the bridge comprising a first set of elongate members and a second set of elongate members movable relative to each other to provide the adjustable width.

* * * * *